United States Patent
Hastings et al.

(10) Patent No.: US 12,361,311 B2
(45) Date of Patent: Jul. 15, 2025

(54) QUANTUM CODE WITH SIMPLER PAIRWISE CHECKS

(71) Applicant: MICROSOFT TECHNOLOGY LICENSING, LLC, Redmond, WA (US)

(72) Inventors: Matthew Benjamin Hastings, Seattle, WA (US); Zhenghan Wang, Goleta, CA (US); David Alexander Aasen, Santa Barbara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 257 days.

(21) Appl. No.: 17/990,316

(22) Filed: Nov. 18, 2022

(65) Prior Publication Data

US 2024/0354629 A1   Oct. 24, 2024

Related U.S. Application Data

(60) Provisional application No. 63/268,119, filed on Feb. 16, 2022.

(51) Int. Cl.
| | |
|---|---|
| *G06N 10/70* | (2022.01) |
| *B82Y 10/00* | (2011.01) |
| *G06N 10/40* | (2022.01) |

(52) U.S. Cl.
CPC .............. *G06N 10/70* (2022.01); *B82Y 10/00* (2013.01); *G06N 10/40* (2022.01)

(58) Field of Classification Search
CPC ........ G06N 10/40; G06N 10/00; G06N 10/70; B82Y 10/00
See application file for complete search history.

(56) References Cited

U.S. PATENT DOCUMENTS

| | | | | |
|---|---|---|---|---|
| 11,455,207 | B2 * | 9/2022 | Chamberland | ........ G06N 10/20 |
| 11,853,159 | B1 * | 12/2023 | Chamberland | ....... G06F 11/104 |
| 2020/0401927 | A1 * | 12/2020 | Nickerson | ............... G06F 15/16 |
| 2021/0117843 | A1 * | 4/2021 | Delfosse | ............. H03M 13/611 |
| 2022/0059919 | A1 * | 2/2022 | Underwood | ........... G06N 10/00 |

(Continued)

OTHER PUBLICATIONS

Song et al. ("Optimal Thresholds for Fraction Codes and Random Spin Models With Subsystem Symmetry", Dec. 9, 2021, Phys. Rev. Lett. 129, 230502) (Year: 2021).*

(Continued)

*Primary Examiner* — Daniel F. McMahon
(74) *Attorney, Agent, or Firm* — Workman Nydegger

(57) ABSTRACT

A method and apparatus for performing quantum error correction using an automorphism code related to the honeycomb code. The automorphism code is based on Kramers-Wannier (KW) duality. For embodiments on a hexagonal lattice using three repeated time steps, ⅓ of the pixels are active in a given time steps. In a given time step r, a KW circuit is applied to plaquettes labeled r mod 3, transferring quantum information from the active qubits at the beginning to a new set of active qubits at the end of the time step. Each of the three plaquette types is associated with one stabilizer either given by a product of six Z operators or three X operators. The KW circuit maps the product of X operators to the product of Z operators and vice-versa. The stabilizer group of the superlattice toric code changes every round.

20 Claims, 10 Drawing Sheets

(56) References Cited

U.S. PATENT DOCUMENTS

| | | | | |
|---|---|---|---|---|
| 2022/0269963 A1* | 8/2022 | Delfosse | ............. | G06F 16/9024 |
| 2023/0162081 A1* | 5/2023 | Verresen | ................ | G06N 10/20 |
| | | | | 324/300 |
| 2024/0354629 A1* | 10/2024 | Hastings | ................ | G06N 10/70 |

OTHER PUBLICATIONS

Vodola et al., "Fundamental threshold of realistic quantum error correction circuits from classical spin models", arXiv:2104.04847v2 [quant-ph], Dec. 22, 2021 (Year: 2021).*

Bombin et al., "Statistical Mechanical Models and Topological Color Codes", arXiv:0711.0468 [quant-ph], Nov. 3, 2007 (Year: 2007).*

Hastings, et al., "Dynamically Generated Logical Qubits", In Repository of arXiv:2107.02194v2, Oct. 12, 2021, 19 Pages.

U.S. Appl. No. 63/268,119, filed Feb. 16, 2022.

Ashkenazi, et al., "Duality as a Feasible Physical Transformation", arxiv.2111.04765v1, Nov. 8, 2021, 16 pages.

International Search Report and Written Opinion received for PCT Application No. PCT/US2022/052863 (MS#411137-PCT01), Feb. 5, 2024, 14 pages.

Kuo, et al., "Comparison of 2D topological codes and their decoding performances", arxiv:2202.06612v1, Feb. 14, 2022, 6 pages.

Lootens, et al., "Mapping between Morita equivalent string-net states with a constant depth quantum circuit", arxiv:2112.12757v1, Dec. 23, 2021, 13 pages.

Tantivasadakarn, et al., "Long-range entanglement from measuring symmetry-protected topological phases", arxiv:2112.01519v2, Jan. 6, 2022, 19 pages.

* cited by examiner

QUANTUM CODE WITH SIMPLER PAIRWISE CHECKS

CROSS-REFERENCE TO RELATED APPLICATIONS

This application claims the benefit of and priority to U.S. Provisional Patent Application Ser. No. 63/268,119 filed on Feb. 16, 2022 and entitled "QUANTUM CODE WITH SIMPLER PAIRWISE CHECKS," which application is expressly incorporated herein by reference in its entirety.

FIELD

The field of the disclosure relates to quantum error correction and improvements thereof.

BACKGROUND

Quantum computing and information processing have great potential, but to achieve this potential several unique challenges must be overcome. Among these unique challenges is decoherence of quantum states arising from coupling between qubits and their environment. This decoherence challenge can be addressed is several ways, each of which have relative advantages and disadvantages. There are benefits to exploring multiple approaches to the decoherence challenge, including different types of qubit technologies, architectures, and codes.

One approach is quantum error correction, which is used in quantum computing to protect quantum information from errors due to decoherence and other quantum noise. Quantum error correction can be important to achieve fault-tolerant quantum computation that can reduce the effects of noise on stored quantum information, faulty quantum gates, faulty quantum preparation, and faulty measurements.

Generally, quantum error correction includes a series of syndrome measurements resulting in an indication whether a fault (or error) has occurred. Decoding the results for the syndrome measurements may provide information about which fault occurred and regarding which unitary operator can be performed to correct the fault.

Different qubit configurations and codes operating thereon (e.g., syndrome measurements) have different advantages with respect to overhead, code distance, and complexity. For example, the honeycomb code has been shown to be a toric code that provides good code distance using two-qubit Pauli operators as check. The simplicity of the honeycomb code may make it useful for applications, especially in architectures where the basic operation is a pairwise measurement such as Majorana devices. Further, the honeycomb code has dynamically generated logical qubits, or "Floquet codes."

The honeycomb code is a recently developed fault-tolerant quantum error correcting code. Beyond its possible practical application to Majorana hardware, this code has several interesting theoretical features. Although it is defined by a sequence of measurements of products of Paulis, it is not a stabilizer or subsystem code. Rather, the logical qubits are "dynamically generated", being protected only because of the particular sequence of measurements chosen. Moreover, while at any instant the system is in a stabilizer state which is equivalent to the toric code (up to a local quantum circuit), the measurements implement an automorphism $e \leftrightarrow m$ of the toric code. The checks are done in a repeating sequence, but after one period the electric and magnetic logical operators of the code are interchanged so that a state storing quantum information may be only invariant with twice the period.

Alternatives to the honeycomb code may prove desirable due to relative advantages with respect to complexity or practical implementation. Here, an alternative to the honeycomb code is disclosed using a measurement-based realization of Kramers-Wannier duality.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a device that includes a quantum processor and a classical processor. The quantum processor includes a plurality of qubits arranged in a 3-colorable lattice of plaquettes. Each of the plaquettes is one of a first plaquette type, a second plaquette type, or third plaquette type, such that each plaquette is surrounded by plaquettes of different plaquette types than a plaquette type of the each plaquette. The classical processor controls quantum measurements on the plurality of qubits to perform a quantum error correction code based on Kramers-Wannier duality by performing a Kramers-Wannier circuit in a periodic sequence.

A further embodiment is the aforementioned embodiment of the device wherein each of said plaquettes consists of six qubits.

A further embodiment is any of the aforementioned embodiments of the device, wherein the classical processor performs the quantum error correction code as rounds of a repeating sequence of three steps.

A further embodiment is any of the aforementioned embodiments of the device, wherein at a beginning of each of the three steps one third of the qubits are active qubits, and which qubits are the active qubits is different for each of the three steps.

A further embodiment is any of the aforementioned embodiments of the device, wherein the quantum error correction code is an automorphism code. The automorphism code includes that at each time step, the Kramers-Wannier circuit maps a logical operator to another logical operator and vice versa. For each of the rounds of the three steps, the logical operator alternates with the another logical operator.

A further embodiment is any of the aforementioned embodiments of the device, wherein the classical processor controls the quantum measurements to perform the Kramers-Wannier circuit in a periodic sequence. The periodic sequence includes that a first step of the three steps is performed by performing the Kramers-Wannier circuit on qubits of the plaquettes of the first plaquette type. A second step of the three steps is performed by performing the Kramers-Wannier circuit on qubits of the plaquettes of the second plaquette type. A third step of the three steps is performed by performing the Kramers-Wannier circuit on qubits of the plaquettes of the third plaquette type.

A further embodiment is any of the aforementioned embodiments of the device, wherein the Kramers-Wannier circuit maps a product of Z operators to a product of X operators and maps products of X operators to respective products of Z operators.

A further embodiment is any of the aforementioned embodiments of the device, wherein the Kramers-Wannier circuit implements one of four types of Kramers-Wannier duality, and the classical processor uses results of the quantum measurements on the plurality of qubits to determine which of the four types of Kramers-Wannier duality was implemented.

A further embodiment is any of the aforementioned embodiments of the device, wherein the classical processor records measurement outcomes from each step of the periodic sequence of the quantum error correction code. The classical processor determines how plaquette stabilizers evolve based on the record measurement outcomes. The classical processor checks whether the record measurement outcomes agree with expected outcomes. When the record measurement outcomes do not agree with the expected outcomes, (i) the classical processor signals a fault occurred and (ii) the classical processor determines which fault occurred and applies one or more corrective unitary operators to the plurality of qubits.

A further embodiment is any of the aforementioned embodiments of the device, wherein the Kramers-Wannier circuit maps a product of X operators to a product of Z operators and vice-versa.

A further embodiment is any of the aforementioned embodiments of the device, wherein the Kramers-Wannier circuit comprises a set of Hadamard gates, a set of single-qubit Z measurements, a set of two-qubit XX measurements, a set of two-qubit ZZ measurements, and a set of single-qubit X measurements.

A further embodiment is any of the aforementioned embodiments of the device, wherein the Kramers-Wannier circuit comprises, a set of single-qubit X measurements, a set of two-qubit XZ measurements, a set of two-qubit ZX measurements, and another set of single-qubit X measurements.

A further embodiment is any of the aforementioned embodiments of the device, wherein the Kramers-Wannier circuit comprises a first set of single-qubit X measurements, a first set of controlled Z gates, a second set of controlled Z gates, and a second set of single-qubit X measurements.

Another embodiment illustrated herein is a method of performing an error correction code. The method includes using a classical processor to control quantum measurements on a plurality of qubits to perform a quantum error correction code, the quantum error correction code being based on Kramers-Wannier duality, and the quantum error correction code includes performing a Kramers-Wannier circuit in a periodic sequence. The plurality of qubits is arranged in a 3-colorable lattice of plaquettes, each of the plaquettes being one of a first plaquette type, a second plaquette type, or third plaquette type, such that each plaquette is surrounded by plaquettes of different plaquette types than a plaquette type of the each plaquette.

A further embodiment is the aforementioned embodiments of the method, wherein the classical processor controls the quantum measurements on the plurality of qubits such that the quantum error correction code is performed as rounds of a repeating sequence of three steps.

A further embodiment is any of the aforementioned embodiments of the method, wherein the classical processor controls the quantum measurements on the plurality of qubits to perform the periodic sequence that includes three steps. In a first step of the three steps, the Kramers-Wannier circuit is performed on qubits of the plaquettes of the first plaquette type. In a second step of the three steps, the Kramers-Wannier circuit is performed on qubits of the plaquettes of the second plaquette type. In a third step of the three steps, the Kramers-Wannier circuit is performed on qubits of the plaquettes of the third plaquette type.

A further embodiment is any of the aforementioned embodiments of the method, wherein the classical processor controls the quantum measurements to perform the quantum error correction code that is an automorphism code such that, at each step, the Kramers-Wannier circuit maps a logical operator to another logical operator and vice versa, and, for each of the rounds of the three steps, the logical operator alternates with the another logical operator.

A further embodiment is any of the aforementioned embodiments of the method, wherein the classical processor controls the quantum measurements to perform the Kramers-Wannier circuit, and Kramers-Wannier circuit maps a product of Z operators to a product of X operators and maps products of X operators to respective products of X operators.

A further embodiment is any of the aforementioned embodiments of the method, wherein the classical processor controls the quantum measurements on the plurality of qubits to perform the Kramers-Wannier circuit, wherein the Kramers-Wannier circuit implements one of four types of Kramers-Wannier duality, and the classical processor uses results of the quantum measurements on the plurality of qubits to determine which of the four types of Kramers-Wannier duality was implemented.

A further embodiment is any of the aforementioned embodiments of the method, wherein the classical processor performs the following steps of: (1) recording measurement outcomes from each step of the periodic sequence of the quantum error correction code; (2) determining how plaquette stabilizers evolve based on the record measurement outcomes; (3) checking whether the record measurement outcomes agree with expected outcomes; and (4), when the record measurement outcomes do not agree with expected outcomes, the classical processor performs steps of (i) signaling a fault occurred, (ii) determining which fault occurred, and (iii) applying one or more corrective unitary operators to the plurality of qubits This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1A:
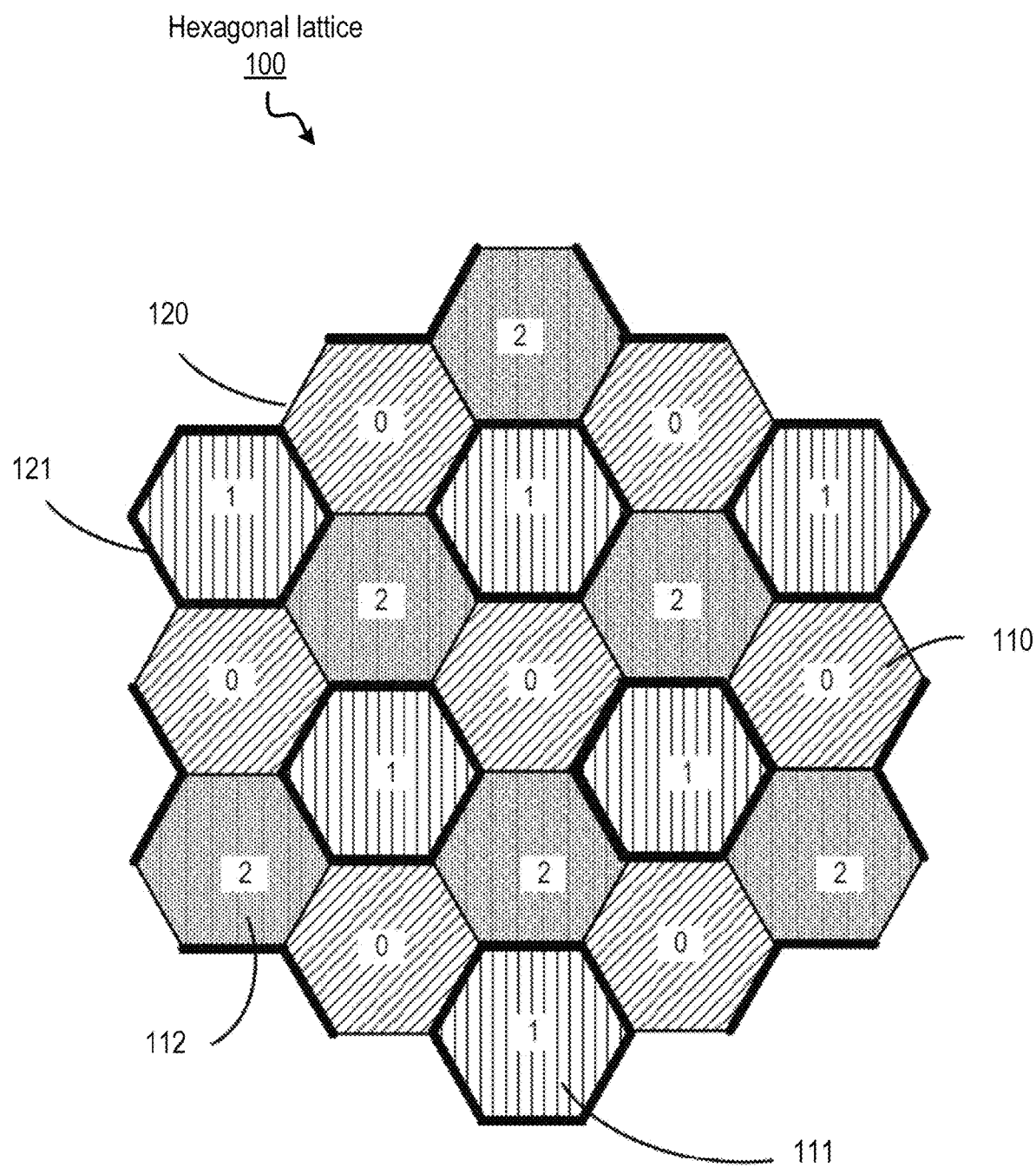
FIG. 1A illustrates a hexagonal lattice, according to one embodiment.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

As discussed above, the honeycomb code is a fault-tolerant quantum memory defined by a sequence of checks which implements a nontrivial automorphism of the toric code. Here, a toric code is presented. The toric code is an alternative to the honeycomb code and is related to Kramers-Wannier duality, as discussed in D. Aasen, Z. Wang, and M. Hastings, "Adiabatic paths of Hamiltonians, symmetries of topological order, and automorphism codes," Phys. Rev. B, vol. 106, p. 085122 (Aug. 15, 2022), and discussed in https://arxiv.org/abs/22033.11137, both of which are incorporated herein by reference in their entirety. The code is similar to the honeycomb code in that it implements a non-trivial automorphism of the toric code after three rounds of measurement. In contrast to the honeycomb code, the code presented herein advantageously involves only two qubit XX and ZZ measurements in addition to single-qubit X and Z measurements.

The code disclosed herein is a measurement-based quantum code that is often referred to as the "e↔m automorphism code." According to certain embodiments, the e↔m automorphism code can be defined by a periodic sequence of measurements on a hexagonal lattice with qubits on the edges. The instantaneous stabilizer group of the e↔m automorphism code is equivalent to the stabilizer group of a triangular super-lattice toric code with additional decoupled degrees of freedom. The triangular super-lattice varies from round to round, similar to the honeycomb code. The instantaneous stabilizer group can be defined to be the stabilizer group after some given number of rounds of the circuit. Like the honeycomb code, the e↔m automorphism code implements a non-trivial automorphism of the super-lattice toric code once per period. Up to measurement-dependent signs, the e↔m automorphism code implements the adiabatic path discussed in the previous section. According to certain embodiments, the primary tool used for defining this code is a measurement-based realization of Kramers-Wannier duality, which ultimately comes from the non-trivial invertible bimodule over $\text{Vec}_{Z_2}$. The Kramers-Wannier duality can also be implemented using the method disclosed in N. Tantivasadakarn et al., "Long-range entanglement from measuring symmetry-protected topological phases," arXiv: 2112.01519, which is incorporated herein in its entirety. The trivial invertible domain wall will also result in a Floquet code with instantaneous stabilizer code given by the usual toric code stabilizers. The resulting Floquet code simply measures different subsets of the usual toric code stabilizers at different times. A person of ordinary skill in the art will recognize that a straightforward generalization of the e↔m automorphism code can be implemented on any 3-colorable graph, as illustrated in FIG. 1A.

The e↔m automorphism code has one qubit per edge of the hexagonal lattice and period three. FIGS. 1A and 2 show the geometry and a nonlimiting example of the code. The thick edges correspond to dead/inactive qubits, while the thinner edges correspond to active qubits (e.g., qubits encoding relevant quantum information). At any given time-step, 1/3 of the qubits are decoupled from the system (thick edges). At time step r, j=(r mod 3) and the Kramers-Wannier circuit $KW^{(j)}$ (e.g., any one of those shown in FIGS. 3A-C) is performed on the type j plaquettes. During the Kramers-Wannier measurement sequence, the dead qubits are transferred from the boundary of the type r+1 mod 3 plaquettes to the boundary of the type r+2 mod 3 plaquettes. The measurement outcomes of the Kramers-Wannier circuit at time step r determine the vertex stabilizers of a toric code living on a triangular super-lattice whose vertices are identified with the r+2 mod 3 plaquettes. After implementing the first three rounds of the Kramers-Wannier circuit, all super-lattice toric code stabilizers are measured.

Now, additional description of the e↔m automorphism code is provided. First, the Kramers-Wannier circuit itself is described. Then, the computation of the instantaneous stabilizer group (ISG) of the e↔m automorphism code are described. It is shown that at any fixed time, the ISG is generated by the stabilizers of the toric code on a triangular super-lattice.

Figure 2:
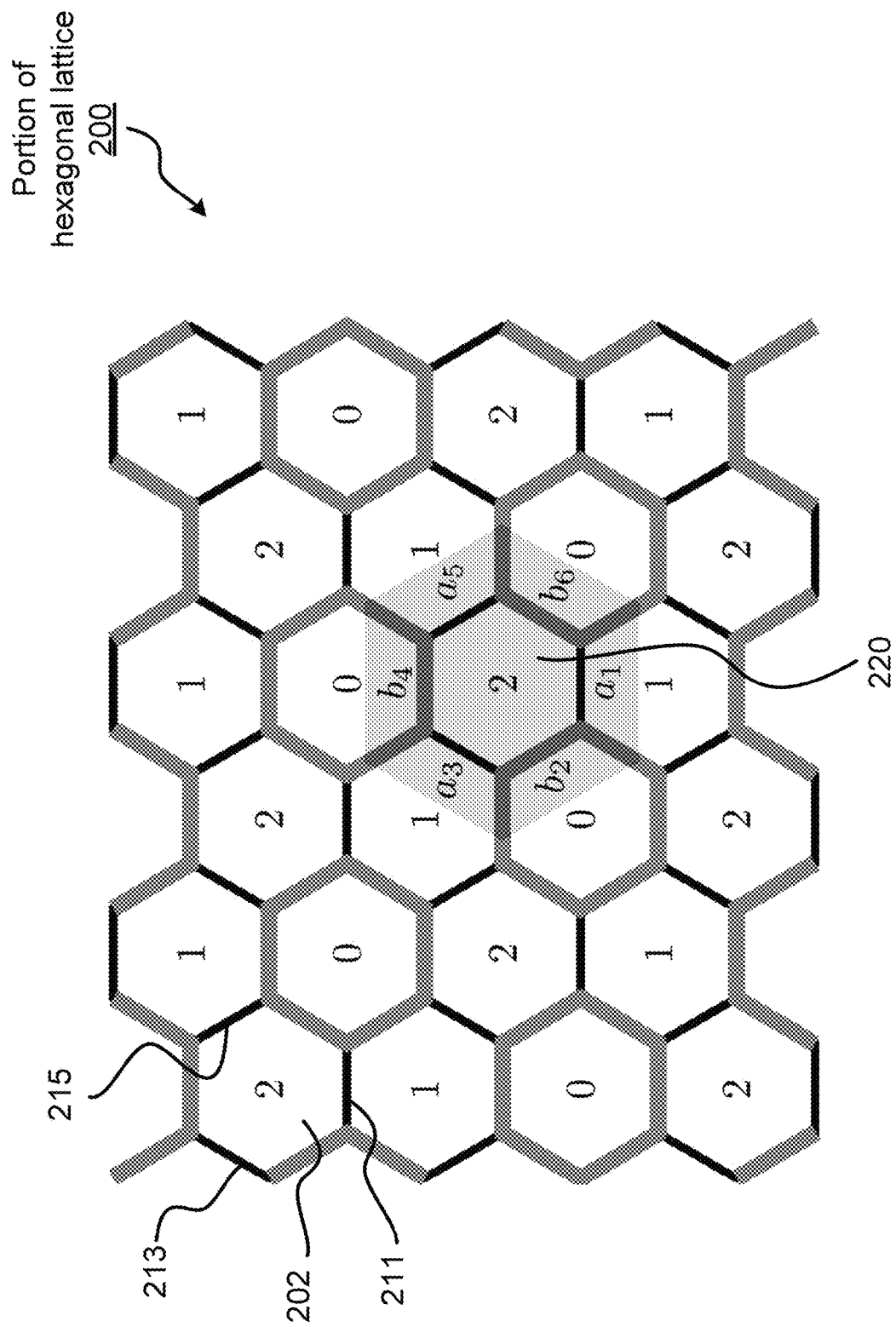
FIG. 2 illustrates a geometry of the e↔m automorphism, according to one embodiment.

Referring now to FIG. 1A, a hexagonal lattice 100 is shown. The coding method can be described with reference to a mapping of qubits to a 3-colorable hexagonal lattice in which each edge is assigned a qubit from a set of qubits. The hexagons are 3-colorable meaning that they can be labeled such that any two neighboring hexagons have different labels. Cell labels are also referred to herein as cell types. As shown in FIG. 1A, a hexagonal lattice 100 is defined in which each hexagon is assigned one of a first, second, or third hexagon label such that each hexagon is surrounded by hexagons having different hexagon labels. In this example, "0," "1," and "2," are used as hexagon labels but any other convenient labels can be used such as red, green, blue or A, B, C. For purposes of illustration, cells associated with each label have a common shading. Hexagons 110, 111, 112 are representative type 0, 1, and 2 hexagons, respectively. In the coding methods disclosed herein, certain qubits are denoted as active or dead during some steps. These designations are shown in FIG. 1A in which a representative edge 120 is associated with an active qubit and a representative edge 121 is associated with a dead qubit. Dead qubits are associated with edges shown with thicker lines.

Figure 1B:
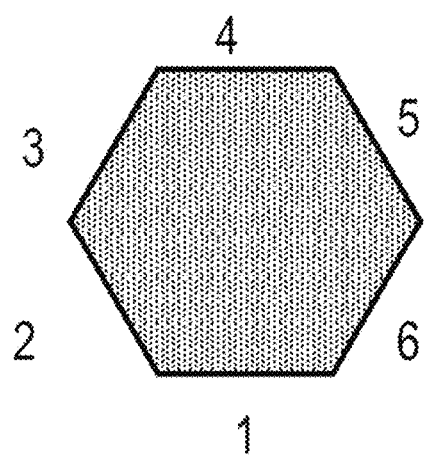
FIG. 1B illustrates a hexagon unit cell, according to one embodiment.

In the explanations, methods and associated apparatus refer in some instances to operations or configurations of edges for purposes of illustration. It should be understood that such references pertain to qubits associated with particular edges. The hexagonal lattice, lattice labeling, and designation of edges as active or dead are illustrative and do not require a particular physical arrangement of qubits. Hexagonal cells are also referred to herein as plaquettes. In the following description, cell edges are referred to as even or odd based on a labeling of a representative cell 150 shown in FIG. 1B.

Representative Processing

Referring to FIG. 2, a portion 200 of a hexagonal lattice used in the e↔m automorphism code. Each edge has one qubit. During a given time step of a toric code (note, as used herein toric code refers to the application of the e↔m automorphism code on a torus, which has the benefit of periodic boundary conditions), the 0-labeled hexagonal cells are designated as inactive as noted with thick lines; active qubits are associated with thin lines. In this example, odd edges such as representative odd edges 211, 213, and 215 of 2-labeled hexagon cell 202 are active. As shown in FIG. 2, the active qubits form a triangular-super lattice with vertices identified with the 0-type plaquettes. For the given time step, all edges of the 0-labeled cells are marked as "dead"; the 2-labeled cells are marked similarly to the 2-labeled hexagon cell 202.

In FIG. 2, a cell 220 has odd-labeled qubits (at odd edges) denoted $a_1$, $a_3$, and $a_5$, and has even-labeled qubits (at even edges) denoted $b_2$, $b_4$, and $b_6$. From the given time step to a next time step, a Kramers-Wannier (KW) circuit, such as KW circuit 300 illustrated in FIG. 3A, transforms the quantum information in these odd qubits $a_1$, $a_3$, and $a_5$, which are active in the given time step, to the even qubits $a_2$, $a_4$, and $a_6$, which are active in the next time step.

Figure 3A:
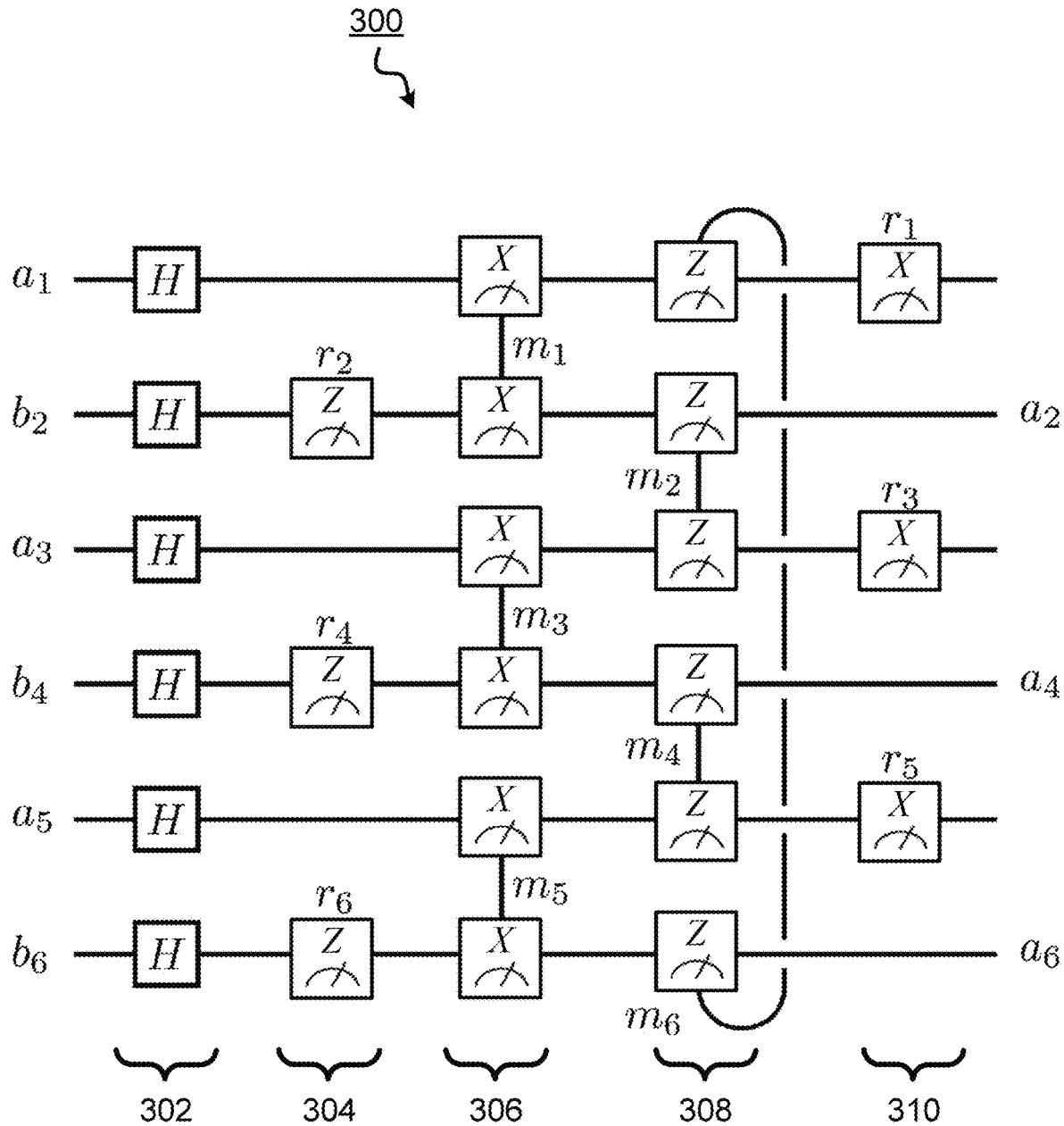
FIG. 3A illustrates a first example of a Kramers-Wannier (KW) circuit, according to one embodiment.
Figure 3B:
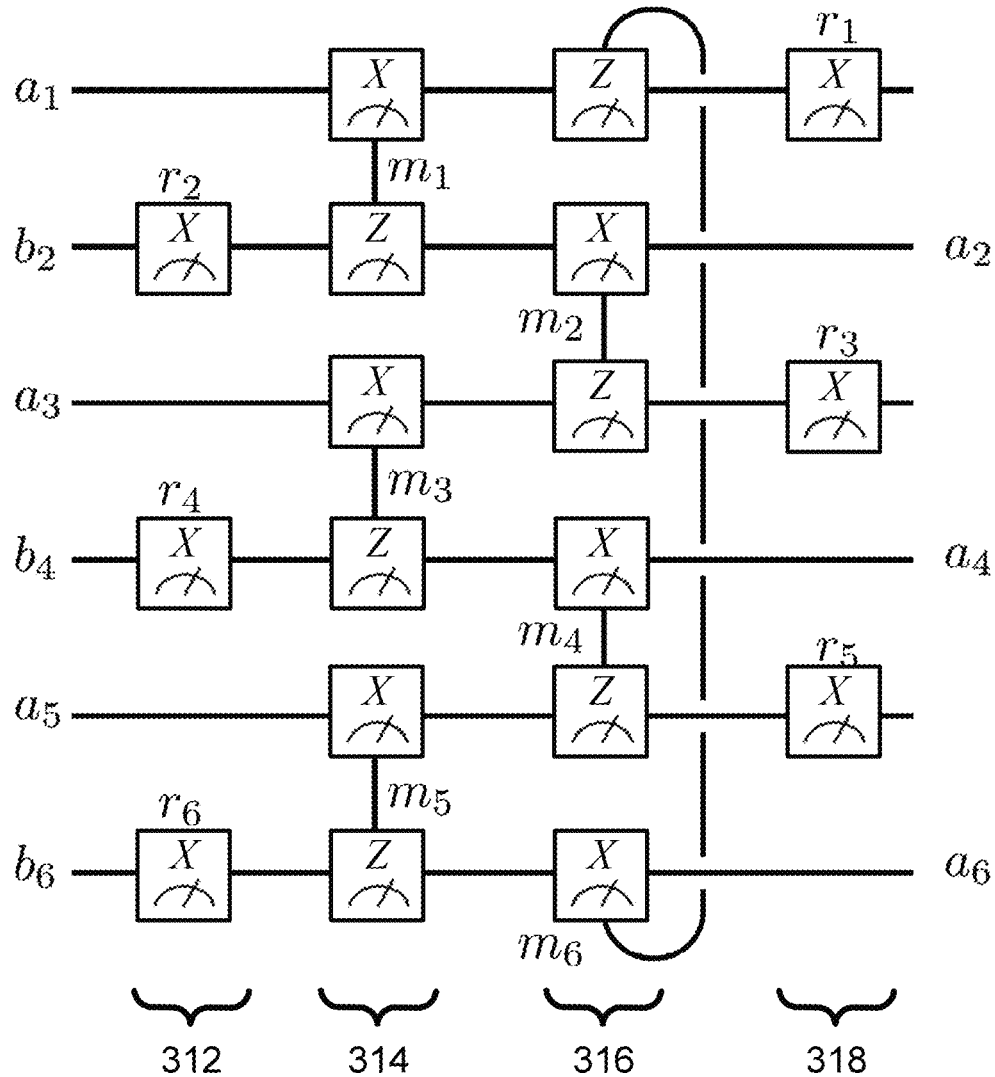
FIG. 3B illustrates a second example of a KW circuit, according to one embodiment.
Figure 3C:
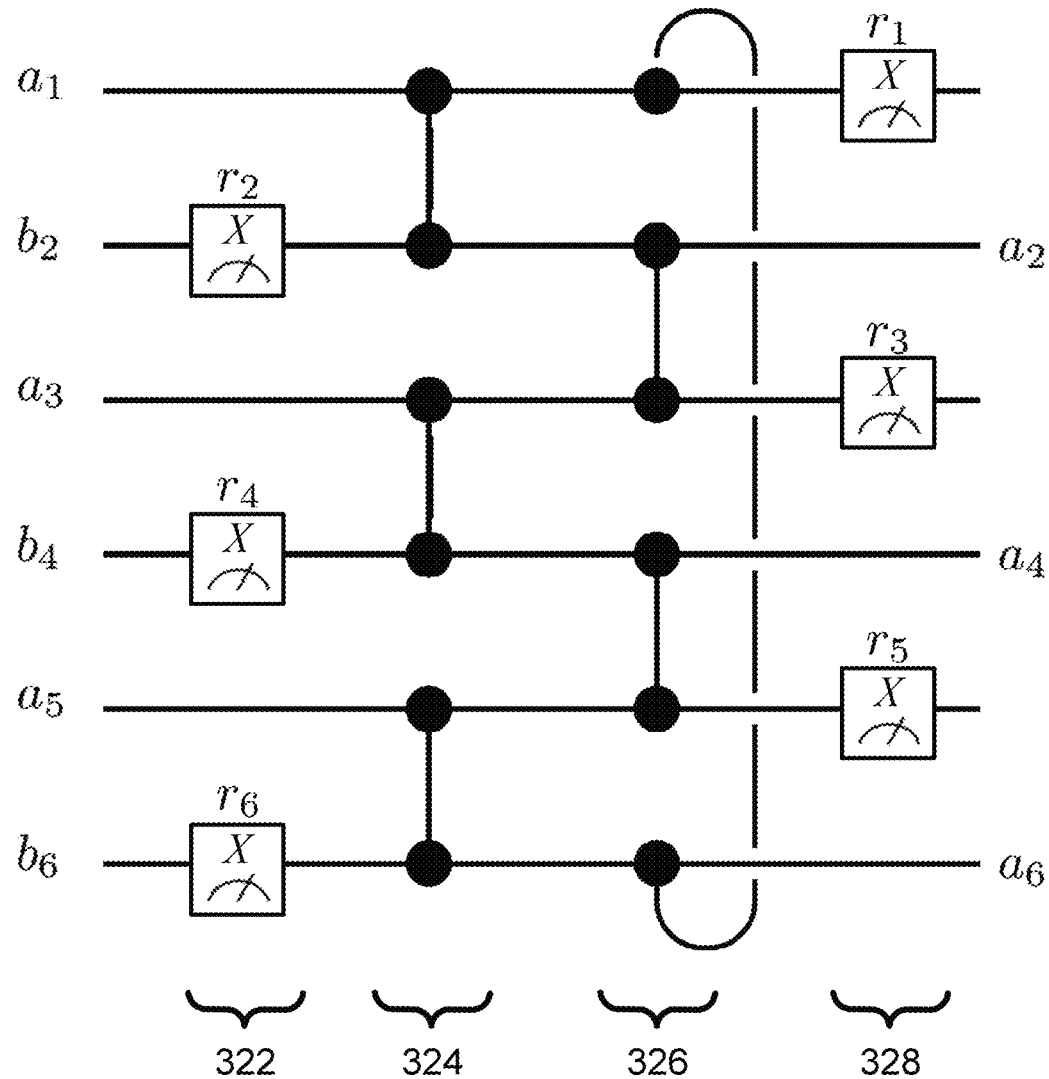
FIG. 3C illustrates a third example of a KW circuit, according to one embodiment.

Referring to FIG. 3A, a representative Kramers-Wannier (KW) circuit 300 is illustrated. KW circuit 300 includes: (i) a set of Hadamard gates 302; (ii) a set of single-qubit Z measurements 304 with measurement results $r_2$, $r_4$, $r_6$; (iii) a set of two-qubit XX-measurements 306 with measurement results $m_1$, $m_3$, $m_5$; (iv) a set of two-qubit ZZ-measurements 308 with measurement results $m_2$, $m_4$, $m_6$; and (v) a set of X-measurements 310 with measurement results $r_1$, $r_3$, $r_5$. A second KW circuit 300' is illustrated in FIG. 3B, and a third KW circuit 300" is illustrated in FIG. 3C. The methods described herein can be performed with any one of these three alternatives (i.e., with either KW circuit 300, KW circuit 300', or KW circuit 300").

Referring to FIG. 3B, a representative Kramers-Wannier (KW) circuit 300' is illustrated, which is an alternative circuit configuration to KW circuit 300. KW circuit 300' is a Kramers-Wannier circuit without the Hadamard gates 302, which are in KW circuit 300. The Hadamard transformation on a qubit can be discarded if one interchanges all subsequent X and Z measurements on that qubit. Thus, the KW circuit 300 is equivalent to KW circuit 300' with only X and Z measurements. KW circuit 300' includes: (i) a set of single-qubit Z-measurements 312 with measurement results $r_2$, $r_4$, $r_6$; (ii) a set of two-qubit XZ-measurements 314 with measurement results $m_1$, $m_3$, $m_5$; (iii) a set of two-qubit XZ-measurements 316 with measurement results $m_2$, $m_4$, $m_6$; and (iv) a set of X-measurements 318 with measurement results $r_1$, $r_3$, $r_5$.

Referring to FIG. 3C, a representative Kramers-Wannier (KW) circuit 300" is illustrated, which is another alternative circuit configuration to KW circuit 300. KW circuit 300" includes: (i) a set of single-qubit X-measurements 322 with measurement results $r_2$, $r_4$, $r_6$; (ii) a first set of two-qubit controlled-Z (CZ) operations 324; (iv) a second set of two-qubit controlled-Z operations 326; and (iv) a set of single-qubit X-measurements 328 with measurement results $r_1$, $r_3$, $r_5$. The matrix elements of a control-Z operation for two qubits are given by $$\langle ab|CZ|a'b'\rangle = \delta_{a,a'}\delta_{b,b'}(-1)^{a+b},$$

which can be written in matrix form as $$\langle ab|CZ|a'b'\rangle = \begin{matrix} 1 & 0 & 0 & 0 \\ 0 & 1 & 0 & 0 \\ 0 & 0 & 1 & 0 \\ 0 & 0 & 0 & -1 \end{matrix}.$$

Returning to FIGS. 2 and 3A, the coding method is described for the cell 220, which is a highlighted plaquette. At time step j=2, the KW circuit 300 is coupled to the all the, including the active qubits $a_1$, $a_3$, and $a_5$ and the inactive qubits $b_2$, $b_4$, and $b_6$. The same KW circuit 300 is applied to all 2-labeled plaquettes.

The sequence of time steps is performed modulo 3, such that, at the subsequent time step j=3 mod 3 which is equal to 0, the KW circuit 300 is applied to all 0-labeled plaquettes. Then, at time step j=4, the KW circuit 300 is applied to all 1-labeled plaquettes, and so forth. For example, at the end of time step j=2, the qubits labeled $a_2$, $a_4$, and $a_6$ at the output of the KW circuit 300 will the active qubits on the 0-labeled plaquettes at the beginning of time step j=3. Thus, from time step to time step, the KW circuit 300 changes which qubits are active. The KW circuit applied at time step j is denoted as $KW^{(j \bmod 3)}$.

Generally, at time step j, a KW circuit $KW^{(j)}$ is applied to edges (qubits) of j-labeled cells and produces measurement outcomes r, m wherein $r=r_1, \ldots, r_6$ and $m_2, \ldots, m_6$. The qubits $b_1$, $b_3$, and $b_5$ are decoupled from the system into the X-basis due to a prior round of measurements. Depending on the measurement outcomes $\{r_j\}$ and $\{m_j\}$ the circuit will implement one of four types of Kramers-Wannier duality, as described below.

The Kramers-Wannier circuit plays a critical role in the e↔m automorphism code. Now, the Kramers-Wannier on 2N qubits is discussed for the e↔m automorphism code for the nonlimiting case N=3. More generally, the code may be applied to any 3-colorable lattice and N is not limited to the value 3.

The initial measurements in the Kramers-Wannier circuit serve to disentangle the odd qubits from the even qubits through the onsite Z measurements. Hence, without loss of generality it may be assumed that the incoming wavefunction is not entangled with the odd qubits. Similarly, the single-qubit X measurements at the end of the circuit disentangle the even qubits out of the wavefunction. As the name suggests, the circuit takes a generic state on the incoming odd qubits and outputs the Kramers-Wannier dual on the outgoing even qubits. There is one caveat, that the Kramers-Wannier dual will depend on the measurement outcomes. For example, if all measurement outcomes are +1, then the standard Kramers-Wannier duality is obtained.

The evolution of the quantum state of the qubits due to the Kramers-Wannier circuit can be straightforwardly computed. Here, only the matrix elements between the even and odd qubits are discussed, as the remaining degrees of freedom are decoupled and determined by the single-qubit X and Z measurements on the odd and even qubits respectively. Up to normalization, the matrix elements are given by, $$\langle \{a_{2j}\}|KW_{r,m}|\{a_{2j+1}\}\rangle = \prod_j (-1)^{(a_{2j+1}+r_{2j+1})(a_{2j}+a_{2j+2}+m_{2j}+r_{2j+2})}(-1)^{a_{2j}(m_{2j-1}+r_{2j-1})+r_{2j-1}r_{2j}}.$$

Wherein $r=(r_1, \ldots, r_{2N})$ and $m=(m_1, \ldots, m_{2N})$ are lists of measurement outcomes and take values in $d\mathbb{F}_2^{2N}$. The r measurements determine the values of the incoming and outgoing ancillas. We mention that $KW_{0,0}$ is the standard Kramers-Wannier transformation.

It is helpful to analyze the commutation relations of $KW_{r,m}$ with the operators ZZ and X, resulting in $$KW_{r,m}X_{2j+1} = (-1)^{m_{2j}+r_{2j+2}}Z_{2j}Z_{2j+2}KW_{r,m}$$

$$KW_{r,m}Z_{2j-1}Z_{2j+1} = (-1)^{m_{2j-1}+r_{2j+1}}X_{2j}KW_{r,m}$$

In particular, $$KW_{r,m}\left(\prod_j X_{2j+1}\right) = KW_{r,m}\left(\prod_j (-1)^{m_{2j}+r_{2j}}\right),$$

$$\left(\prod_j X_{2j}\right)KW_{r,m} = \left(\prod_j (-1)^{m_{2j-1}+r_{2j-1}}\right)KW_{r,m}.$$

Therefore, four kinds of Kramers-Wannier duality are manifest, determined by the mod 2 value of $\Sigma_j m_{2j}+r_{2j}$ and $\Sigma_j m_{2j-1}+r_{2j-1}$. Equivalently, the above two equations show that the Kramers-Wannier circuit measures $X_1 X_3 \ldots X_{2N-1}$ 1 on the initial state, with measurement outcome $(-1)^{\Sigma_j m_{2j}+r_{2j}}$ and prepares a given $X_2 X_4 \ldots X_{2N}$ in the final state, with eigenvalue $(-1)^{\Sigma_j m_{2j-1}+r_{2j-1}}$.

The Toric Floquet Code and its Instantaneous Stabilizer Group

Now, a description is provided a description of the toric Floquet code (also called e↔m automorphism code) and its instantaneous stabilizer group (ISG). More particularly, the toric Floquet code and compute its instantaneous stabilizer group are presented.

A nonlimiting example of the code is given by the following measurement schedule. First, initialize the code by measuring all type 0 and type 2 edges in the X basis. Then, at time r run the Kramers-Wannier circuit on all type r mod 3 plaquettes of the hexagon lattice shown in FIG. 2, starting with r=0.

Now, the instantaneous stabilizer group (ISG) is calculated, according to one embodiment. The ISG is defined to be the stabilizer group after a given number of rounds of the circuit. The following disclosure relies on the following additional notation. Let $P^{(r)}$ be the set of plaquettes of type r, and $E^{(r)}$ be the set of edges of type r. An edge $e \in E^{(r)}$ terminates on two type r plaquettes. The edges at the boundary of a plaquette p is referred to by $\partial p$. Similarly, the notation $e \in p_r$ is used to label all edges terminating on a plaquette $p_r \in P^{(r)}$.

Starting with the maximally mixed state, at time step r the Kramers-Wannier circuit is implemented on all type r mod 3 plaquettes starting with r=0. The Kramers-Wannier circuit is run on all type 0 plaquettes. The type 0 plaquettes have type 1 and 2 edges at there boundaries. After running the Kramers-Wannier circuit on the type 0 plaquettes, the type 1 edges will be dead, and the type 2 edges will be active. The type 0 edges will be unmodified. The equation $$\left(\prod_j X_{2j}\right)KW_{r,m} = \left(\prod_j (-1)^{m_{2j-1}+r_{2j-1}}\right)KW_{r,m}$$

indicates that the value of $\prod_{e \in \partial p_0 \cap E^{(2)}} X_e$ for each $p_0 \in P^{(0)}$ is determined by the measurements done on the boundary of plaquette $p_0$. Thus, the instantaneous stabilizer group is given by $$ISG_0 = \left\langle \prod_{e \in \partial p_0 \cap E^{(2)}} X_e, X_{e'}: p_0 \in P^{(0)}, e' \in E^{(1)} \right\rangle.$$

Next, the Kramers-Wannier circuit is measured on the plaquettes of type 1. Initially, all type 2 qubits are active and all type 1 qubits are dead. After the Kramers-Wannier circuit on the type 1 plaquettes, the type 1 and 2 edges will be dead, and the type 0 edges will be active. The circuit will measure a new set of stabilizers associated with the type 1 plaquettes given by $\prod_{e \in \partial p_1 \cap E^{(0)}} X_e$ for $p_1 \in P^{(1)}$. As above, the stabilizer eigenvalue can be inferred by the measurement outcomes via the equation $$\left(\prod_j X_{2j}\right)KW_{r,m} = \left(\prod_j (-1)^{m_{2j-1}+r_{2j-1}}\right)KW_{r,m}.$$

The circuit will also transfer the stabilizer associated with the type 0 plaquettes in $ISG_0$, from the product of three X operators, to a product of six Z operators due to the relation given in the equations $$W_{r,m}X_{2j+1} = (-1)^{m_{2j}+r_{2j+2}}Z_{2j}Z_{2j+2}KW_{r,m}$$

$$KW_{r,m}Z_{2j-1}Z_{2j+1} = (-1)^{m_{2j-1}+r_{2j+1}}X_{2j}KW_{r,m}.$$

Specifically, the stabilizer $\prod_{e \in \partial p_0 \cap E^{(2)}} X_e \in ISG_0$ becomes $\pm \prod_{e \ni \partial p_0} Z_e$ where denotes a type 0 edge e that terminates on a plaquette $p_0$. Again, the overall $\pm$ sign of the stabilizer can be inferred from the measurement outcomes. Thus, $$ISG_1 = \left\langle \prod_{e \in \partial p_1 \cap E^{(0)}} X_e, \prod_{e \ni \partial p_0} Z_e, X_{e'}: p_1 \in P^{(1)}, p_0 \in P^{(0)}, e' \in E^{(1)} \sqcup E^{(2)} \right\rangle.$$

Finally, the Kramers-Wannier circuit is run on the type 2 plaquettes. The circuit measures a new X type stabilizer associated with the type 2 plaquettes given by $\pm \prod_{e \ni \partial p_2 \cap E^{(1)}} X_e$ for $p_2 \in P^{(2)}$. The sign of the stabilizer can be inferred from the measurement outcomes. The circuit also transforms the X stabilizer associated with the type 1 plaquettes to a Z type stabilizer associated with the 6 edges terminating on the type 1 plaquette. Thus, $$ISG_2 = \langle \prod_{e \in p_1} Z_e, \prod_{e \in \partial p_2 \cap E^{(1)}} X_e, \prod_{e \in \partial p_0 \cap E^{(1)}} X_e,$$

$$X_{e'} : p_0 \in P^{(0)}, p_1 \in P^{(1)}, p_2 \in P^{(2)}, e' \in E^{(0)} \sqcup E^{(2)} \rangle.$$

It can be seen that $ISG_2$ is simply the stabilizers of a triangular lattice toric code whose vertices are identified with the type 2 plaquettes. All subsequent steps can be analyzed very similarly.

In summary, the instantaneous stabilizer groups for the e↔m after implementing $KW^{(r \bmod 3)}$ are given by, $$ISG_0 = \langle \prod_{e \in \partial p_0 \cap E^{(2)}} X_e, X_{e'} : p_0 \in P^{(0)}, e' \in E^{(1)} \rangle$$

$$ISG_1 = \langle \prod_{e \in \partial p_1 \cap E^{(0)}} X_e, \prod_{e \in \partial p_0} Z_e, X_{e'} : p_1 \in P^{(1)}, p_0 \in P^{(0)}, e' \in E^{(1)} \sqcup E^{(2)} \rangle$$

$$ISG_{r \geq 2} = \langle \prod_{e \in \partial p_{r-1}} Z_e, \prod_{e \in \partial p_r \cap E^{(r+2)}} X_e,$$

$$\prod_{e \in \partial p_{r+1} \cap E^{(r+2)}} X_e, X_{e'} : p_r \in P^{(r)}, e' \in E^{(r)} \sqcup E^{(r+1)} \rangle.$$

Figure 4A:
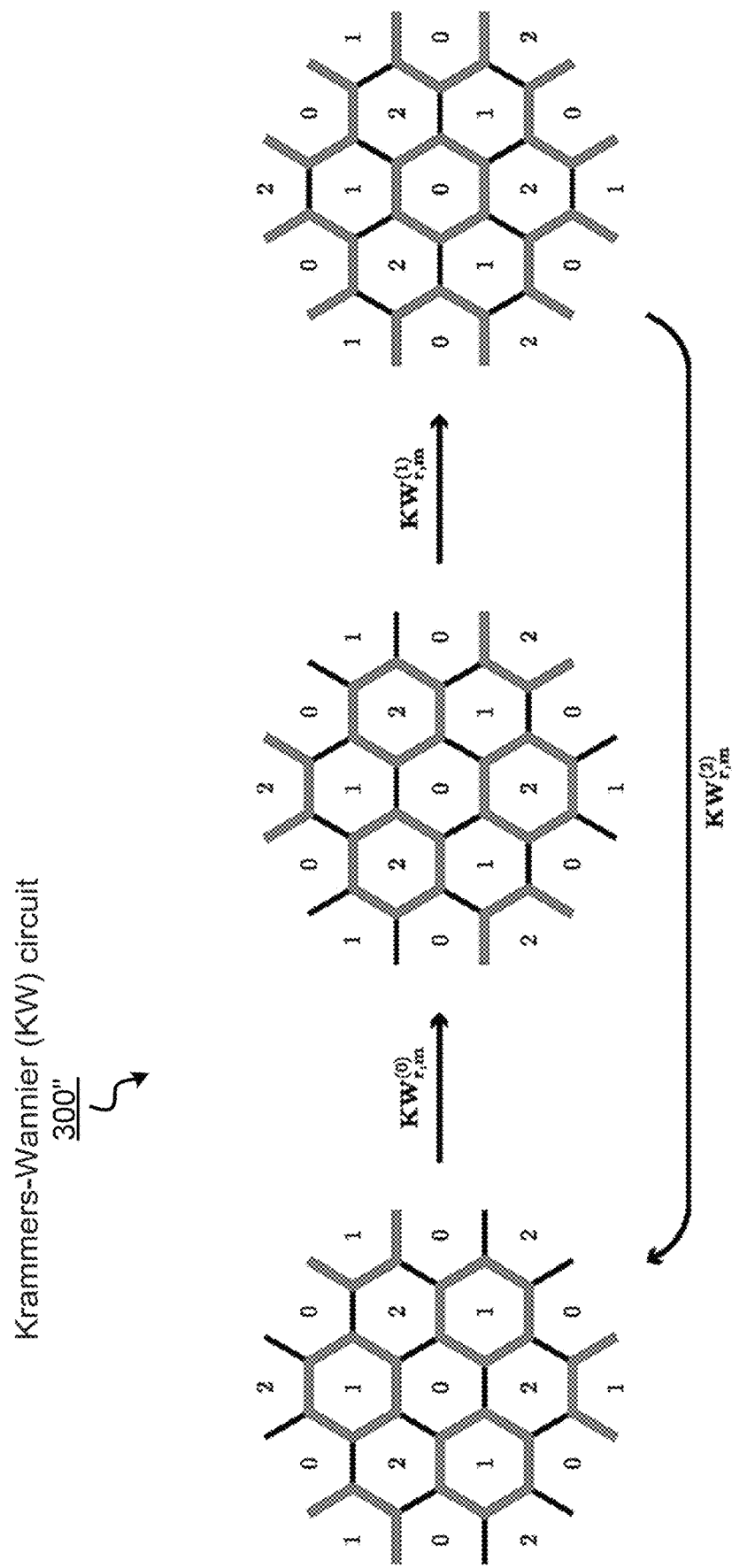
FIG. 4A illustrates a diagrammatic description of the instantaneous stabilizer group for the e↔m automorphism code, according to one embodiment.

FIG. 4A illustrates a diagrammatic description of the instantaneous stabilizer groups (ISGs) 400 for the e↔m automorphism code. Again, thick edges denote "dead" qubits, decoupled from the system in the X basis. Thinner edges denote "active" qubits participating in the toric code existing on the triangular super-lattice with vertices given by the r=1; 2; 0 plaquettes going from left to right. Associated with each plaquette that is surrounded by a thick line is a stabilizer given by the product of six Z operators on the edges terminating on the plaquette. Associated to all other plaquettes are stabilizers given by a product of three X operators on the thinner edges surrounding the plaquette.

Figure 4B:
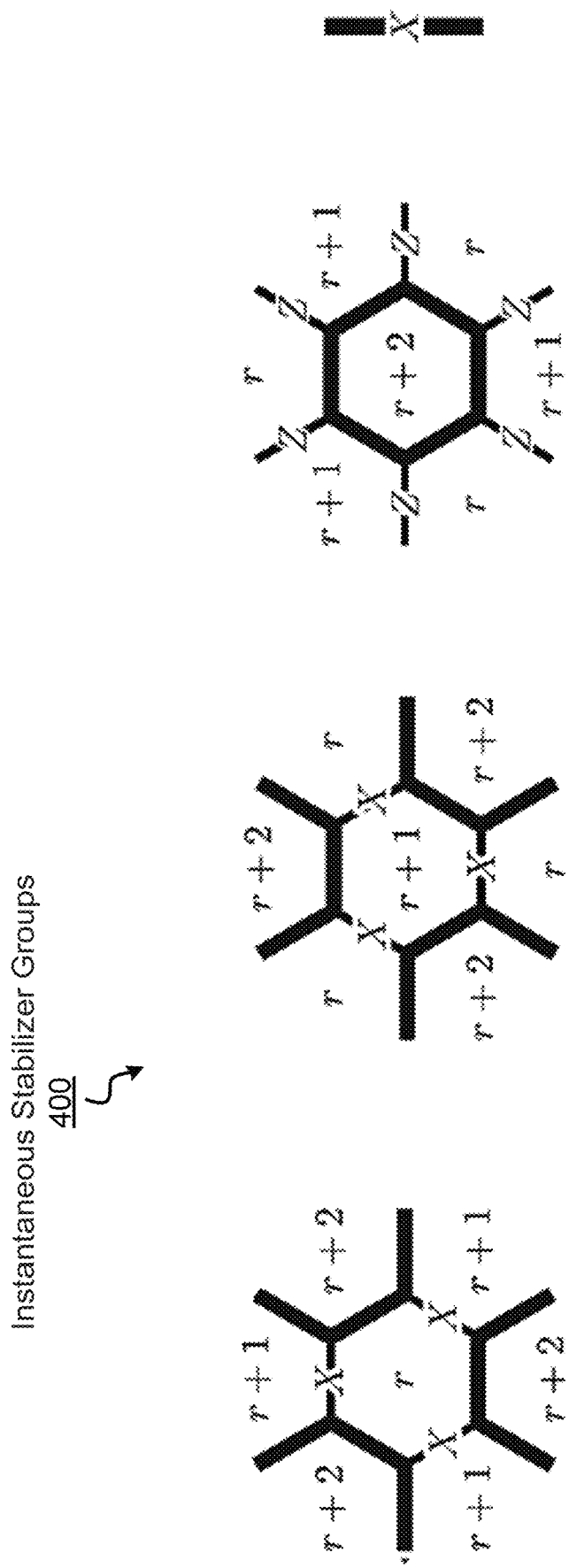
FIG. 4B illustrates respective plaquettes associated with corresponding stabilizers, according to one embodiment.

FIG. 4B illustrates a diagrammatic description of $ISG_{r \geq 2}$. Each plaquette shown in FIG. 4B is associated with one stabilizer, either given by a product of six Z operators or three X operators. Each thick blue denotes a dead qubit, and correspondingly contributes one single site X stabilize per thick edge, shown on the right of FIG. 4B. When r≥2 the stabilizers are exactly those of a triangular super-lattice toric code with vertices identified with r+2 mod 3 plaquettes.

Now, one detail is elucidated. For a superlattice toric code on a closed manifold, the product of all plaquette stabilizers is equal to +1 and the product of all vertex stabilizers is also equal to +1. How does this constraint get passed between rounds of measurement? The new plaquette stabilizers inferred after each round of measurement can be ±1, and so it is not obvious why the product of the superlattice vertex or plaquette stabilizers should be fixed. Suppose a state is stabilized by $ISG_{r-1}$, with each stabilzer's expectation value given by $s_p^{(r-1)}$. Where p runs over every plaquette of the honeycomb lattice. Note that (r−1) mod 3 does not necessarily coincide with plaquette type in the quantity $s_p^{(r-1)}$. The Kramers-Wannier circuit $KW^{(r \bmod 3)}$ is performed on every $p_r \in P^{(r \bmod 3)}$. Denote the measurement outcomes of the Kramers-Wannier circuit on plaquettes $p_r \in P^{(r \bmod 3)}$ as $r_p = (r_{p,1}, \ldots r_{p,6})$ and $m_p = (m_{p,1}, \ldots, m_{p,6})$. Based on the equations $$KW_{r,m} X_{2j+1} = (-1)^{m_{2j} + r_{2j+2}} Z_{2j} Z_{2j+2} KW_{r,m} \text{ and}$$

$$KW_{r,m} Z_{2j-1} Z_{2j+1} = (-1)^{m_{2j-1} + r_{2j+1}} X_{2j} KW_{r,m},$$

it can be seen that $$s_p^{(r-1)} = (-1)^{\sum_j m_{p,2j} + r_{p,2j}} \text{ and}$$

$$s_p^{(r)} = (-1)^{\sum_j m_{p,2j+1} + r_{p,2j+1}},$$

where $p \in P^{(r)}$. That is, for each plaquette $p \in P^{(r \bmod 3)}$, $s_p^{(r-1)}$ is measured and fixed $s_p^{(r)}$ is prepared. It is also seen how the stabilizers on plaquettes $p \in P^{(r-1 \bmod 3)} \sqcup P^{(r+1 \bmod 3)}$ are updated, resulting in $$s_p^{(r)} = (-1)^{\sum_{p' \ni p \cap P^{(r \bmod 3)}} f_{p'}(r_{p'}, m_{p'})} s_p^{(r-1)}, p \in P^{(r-1 \bmod 3)}, \text{ and}$$

$$s_p^{(r)} = (-1)^{\sum_{p' \ni p \cap P^{(r \bmod 3)}} g_{p'}(r_{p'}, m_{p'})} s_p^{(r-1)}, p \in P^{(r+1 \bmod 3)}.$$

Wherein $p' \ni p \cap P^{(r \bmod 3)}$ denotes a plaquette $p' \in P^{(r \bmod 3)}$, which is neighboring p. The function $f_{p'}$ and $g_{p'}$ can be determined using equations $$KW_{r,m} X_{2j+1} = (-1)^{m_{2j} + r_{2j+2}} Z_{2j} Z_{2j+2} KW_{r,m} \text{ and}$$

$$KW_{r,m} Z_{2j-1} Z_{2j+1} = (-1)^{m_{2j-1} + r_{2j+1}} X_{2j} KW_{r,m},$$

Thus, it can be inferred that the evolution of the plaquette stabilizers from $ISG_{r-1}$ to $ISG_r$ under the Kramers-Wannier circuit $KW^{(r)}$. Note, that only the r mod 3 plaquette stabilizers are measured at this step.

Now it can be computed how the product of the super-lattice toric code stabilizers evolve under $KW^{(r)}$. The updated products of plaquette stabilizers are given by, $$\prod_{p \in P^{(r-1 \bmod 3)}} s_p^{(r)} = \left( \prod_{p \in P^{(r \bmod 3)}} (-1)^{\sum_j m_{p,2j} + r_{p,2j}} \right) \prod_{p \in P^{(r-1 \bmod 3)}} s_p^{(r-1)}$$

$$\prod_{p \in P^{(r+1 \bmod 3)}} s_p^{(r)} = \left( \prod_{p \in P^{(r \bmod 3)}} (-1)^{\sum_j m_{p,2j+1} + r_{p,2j+1}} \right) \prod_{p \in P^{(r+1 \bmod 3)}} s_p^{(r-1)}$$

To derive the first equation above, the following expression has been used $$\sum_{p \in P^{(r \bmod 3)}} f_p(r_p, m_p) = \sum_{p \in P^{(r \bmod 3)}} \sum_j m_{p,2j} + r_{p,2j} \bmod 2.$$

To derive the second equation above, a very similar expression has been used. It can be further determined that $$\prod_{p \in P^{(r-1 \bmod 3)}} s_p^{(r)} = \left( \prod_{p \in P^{(r \bmod 3)}} (-1)^{\sum_j m_{p,2j} + r_{p,2j}} \right) \prod_{p \in P^{(r-1 \bmod 3)}} s_p^{(r-1)}$$

-continued $$= \left(\prod_{p \in P^{(r \bmod 3)}} s_p^{(r-1)}\right) \prod_{p \in P^{(r-1 \bmod 3)}} s_p^{(r-1)}.$$

The left side of the equation is the product over all vertex stabilizers of the triangular superlattice toric code at time step r, while the right side is the product over all plaquette stabilizers of the triangular superlattice time step r−1. Similarly, it can be determined that $$\prod_{p \in P^{(r \bmod 3)}} s_p^{(r)} \prod_{p \in P^{(r+1 \bmod 3)}} s_p^{(r)} =$$

$$\prod_{p \in P^{(r \bmod 3)}} (-1)^{\Sigma_j m_{p,2j} + r_{p,2j+1}} \times \left(\prod_{p \in P^{(r \bmod 3)}} (-1)^{\Sigma_j m_{p,2j} + r_{p,2j+1}}\right)$$

$$\prod_{p \in P^{(r+1 \bmod 3)}} s_p^{(r-1)} = \prod_{p \in P^{(r+1 \bmod 3)}} s_p^{(r-1)}$$

The left side is the product of all plaquette stabilizers of the triangular superlattice toric code at time step r, which is equal to the product of all vertex stabilizers of the triangular superlattice toric code at time step r−1.

Logical Operators

The superlattice toric code has well-known logical operators: a product of Pauli X operators on a homologically nontrivial loop on the lattice or a product of Pauli Z operators on a homologically nontrivial loop on the dual lattice. Arbitrarily, one of these may be called electric and the other may be called magnetic.

If some logical operator of the superlattice toric code is measured, the measured logical operator maps to some other logical operator of the toric code after applying the KW circuit.

To see this, note that it has been verified that the ISG is that of the superlattice toric code. Measuring some logical operator of the superlattice toric code increases the rank of the ISG by one, and the increase in rank must be maintained from one round to the next since the rank of the ISG cannot reduce under measurement. So, the result after any number of further rounds must also be a superlattice toric code with one additional stabilizer, and that additional stabilizer must be a logical operator.

Without doing any calculation, it can be inferred that the electric and magnetic operators interchange every round. Indeed, the KW circuit maps a product of X operators to a product of Z operators and vice-versa. Of course, the stabilizer group of the superlattice toric code changes every round, but it is periodic mod 3; since 3 is odd, the electric and magnetic operator interchange every period.

Error Detection

Now error detection and correction are discussed. At time step r, $ISG_r$ is given by $$ISG_r = \langle \prod_{e \in \partial p_{r-1}} Z_e, \prod_{e \in \partial p_r \cap E^{(r+2)}} X_e,$$

$$\prod_{e \in \partial p_{r+1} \cap E^{(r+2)}} X_e, X_{e'} : p_r \in P^{(r)}, e' \in E^{(r)} \sqcup E^{(r+1)} \rangle.$$

Further, $ISG_r$ is diagrammatically represented in FIG. 4B. Suppose a state is stabilized by $ISG_r$, with each stabilizers expectation value given by $s_p^{(r)}$, where p runs over every plaquette of the honeycomb lattice. Note that r mod 3 does not necessarily coincide with plaquette type in the quantity $s_p^{(r)}$. Now, the Kramers-Wannier circuit $KW^{(r+1 \bmod 3)}$ is run on every $p \in P^{(r+1 \bmod 3)}$. The measurement outcomes of the Kramers-Wannier circuit on plaquettes $p' \in P^{(r+1 \bmod 3)}$ are denoted as $r_{p'}$ and $m_{p'}$. Based on the equations $$KW_{r,m}X_{2j+1} = (-1)^{m_{2j}+r_{2j+2}} Z_{2j} Z_{2j+2} KW_{r,m} \text{ and}$$

$$KW_{r,m}Z_{2j-1}Z_{2j+1} = (-1)^{m_{2j-1}+r_{2j+1}} X_{2j} KW_{r,m},$$

it can be seen that $$s_p^{(r+1)} = \begin{cases} (-1)^{g_p(r_p, m_p)} s_p^{(r)} & \text{if } p \in P^{(r+1)}, \\ (-1)^{\Sigma_{p' \ni p \cap P^{(r+1 \bmod 3)}} f_{p'}(r_{p'}, m_{p'})} s_p^{(r)} & \text{otherwise.} \end{cases}$$

Where $p' \in P^{(r+1 \bmod 3)}$ denotes a plaquette $p' \in P^{(r+1 \bmod 3)}$ which is neighboring p, and $f_{p'}$ is linear in $r_{p'}$ and $m_{p'}$. The functions $f$ and $g$ are determined by $$KW_{r,m}X_{2j+1} = (-1)^{m_{2j}+r_{2j+2}} Z_{2j} Z_{2j+2} KW_{r,m} \text{ and}$$

$$KW_{r,m}Z_{2j-1}Z_{2j+1} = (-1)^{m_{2j-1}+r_{2j+1}} X_{2j} KW_{r,m}.$$

Thus, the evolution of the plaquette stabilizers between round r and round r+1 can be inferred. However, only the r+1 mod 3 plaquette stabilizers are measured at this step (the reason ultimately boils down to equations $$KW_{r,m}X_{2j+1} = (-1)^{m_{2j}+r_{2j+2}} Z_{2j} Z_{2j+2} KW_{r,m} \text{ and}$$

$$KW_{r,m}Z_{2j-1}Z_{2j+1} = (-1)^{m_{2j-1}+r_{2j+1}} X_{2j} KW_{r,m}.$$

By recording the measurement outcomes at each step, it can be tracked how the plaquette stabilizers evolve. After three rounds of measurement, the plaquette stabilizers can be compared, and it can be checked whether the results of the measurements agree with the expected outcome. When they do not agree an occurrence of a fault can be detected.

Representative Classical Computing Environment

Figure 5:
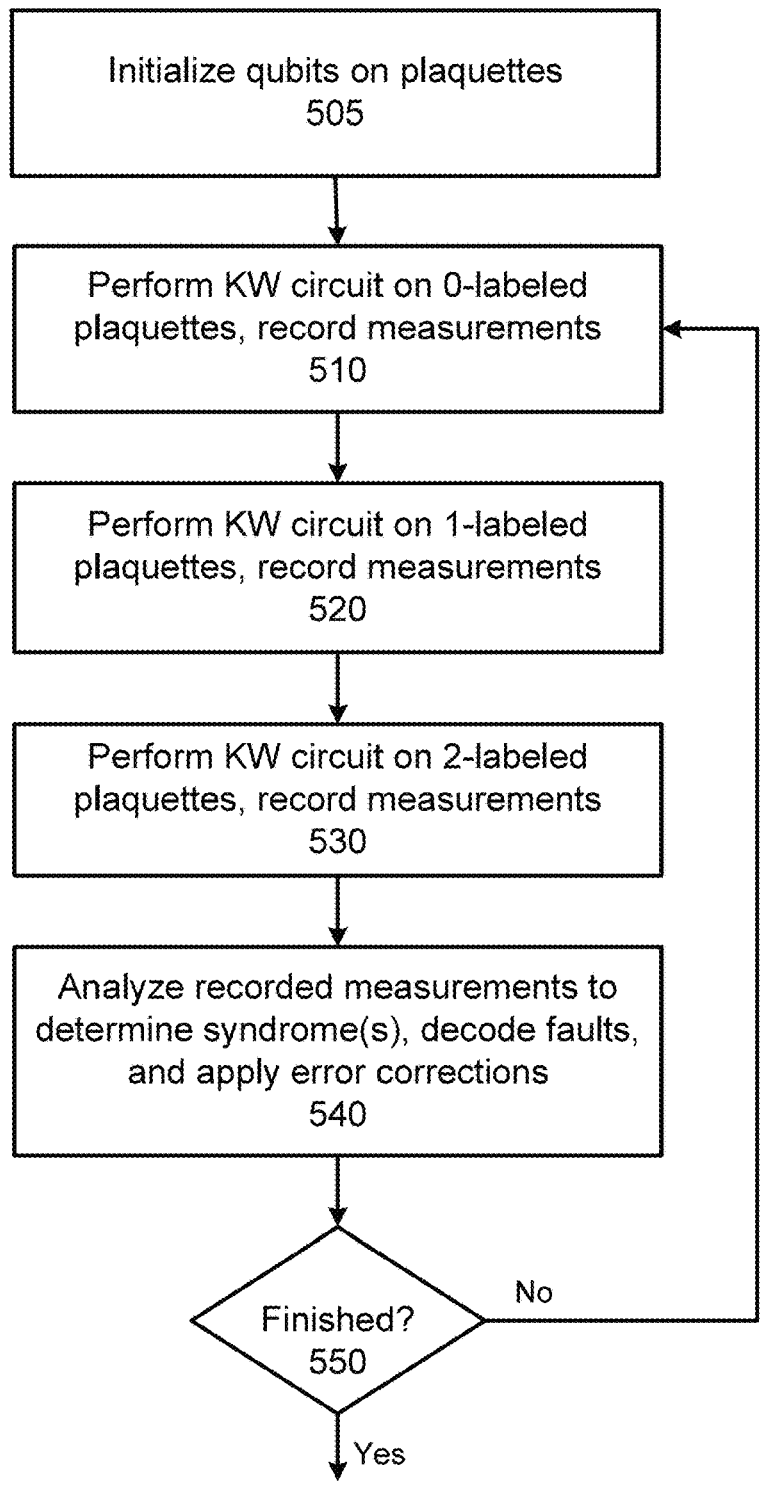
FIG. 5 illustrates a flow diagram for the e↔m automorphism code, according to one embodiment.

FIG. 5 illustrates a method 500 of performing the automorphism e↔m code. Method 500 works for any three-colorable lattice, including the hexagonal lattice discussed above. In step 505 of method 500, the qubits are initialized. In step 510 of method 500, the $KW^{(0)}$ circuit is performed on the type 0 plaquettes, and the values resulting from the quantum measurements are recorded. In step 520 of method 500, the $KW^{(1)}$ circuit is performed on the type 1 plaquettes, and the values resulting from the quantum measurements are recorded. In step 530 of method 500, the $KW^{(2)}$ circuit is performed on the type 2 plaquettes, and the values resulting from the quantum measurements are recorded. In step 540 of method 500, the measurement results from the previous three steps are analyzed to determine if there were any errors. If one or more errors occurred, the measurement results can then be decoded to determine which errors occurred, and what unitary operations are to be performed on the qubits to correct the errors. As indicated by step 550, this process can be repeated until error correction is no longer needed, and the process is finished.

Various embodiments of the methods disclosed herein can also be described in the general context of computer-executable instructions (such as those included in program modules) being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

Figure 6:
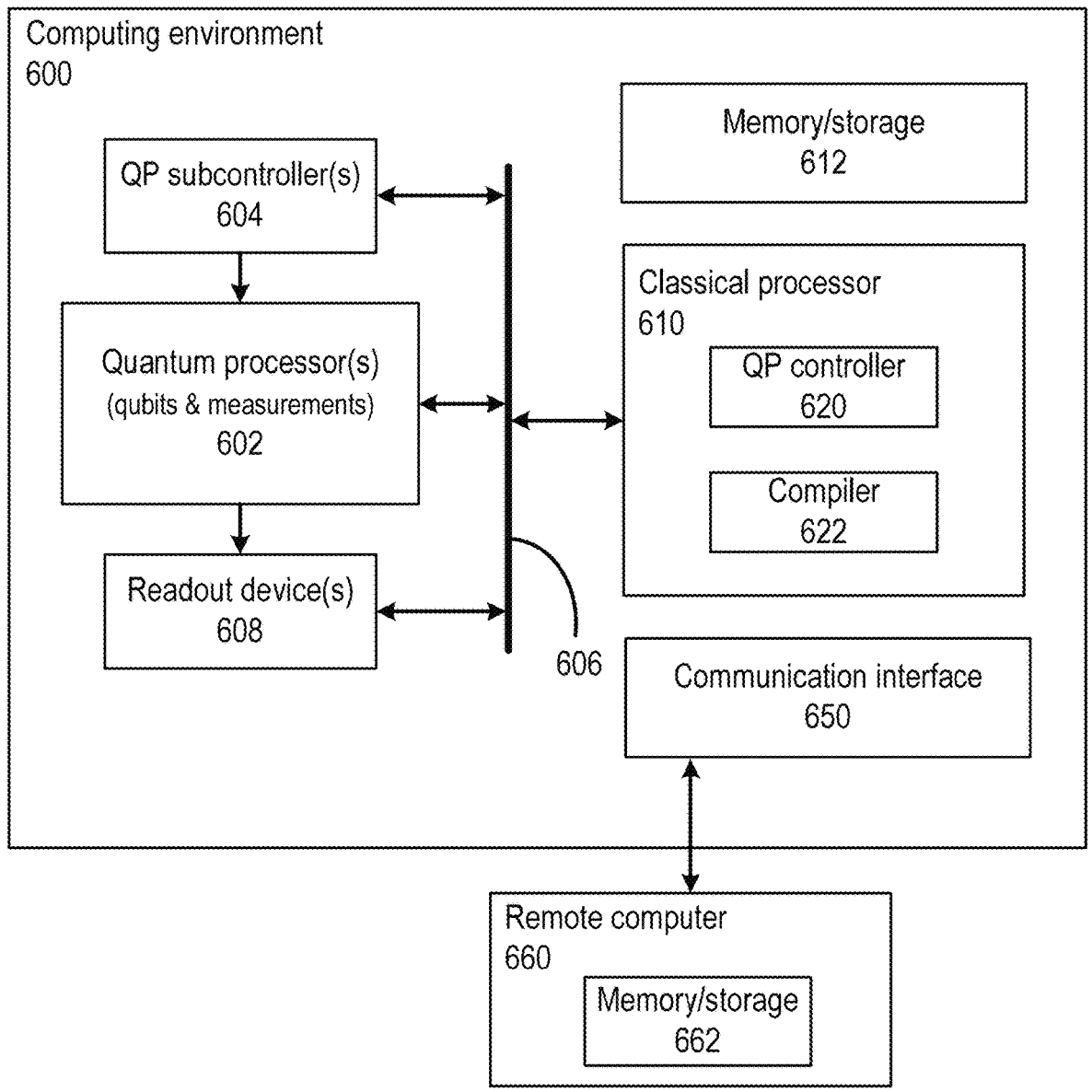
FIG. 6 illustrates classical processing system coupled to a quantum processor that executes the e↔m automorphism codes, according to one embodiment.

With reference to FIG. 6, an exemplary system for implementing the disclosed technology includes computing environment 600. In computing environment 600, a compiled quantum computer circuit description (including quantum circuits for performing any of the disclosed techniques as disclosed herein) can be used to program (or configure) one or more quantum processors such that the quantum processor(s) implement the circuit described by the quantum computer circuit description.

The environment computing 600 includes one or more quantum processors 602 and one or more readout device(s) 608. The quantum processor(s) execute quantum circuits, such as the KW circuits disclosed herein, that are precompiled and described by the quantum computer circuit description. The quantum processor(s) can be one or more of the following nonlimiting examples: (a) a superconducting quantum computer; (b) an ion trap quantum computer; (c) a fault-tolerant architecture for quantum computing; and/or (d) a topological quantum architecture (e.g., a topological quantum computing device using Majorana zero modes). The precompiled quantum circuits, including any of the disclosed circuits, can be sent into (or otherwise applied to) the quantum processor(s) via control lines 606 at the control of quantum processor controller 620. The quantum processor controller (QP controller) 620 can operate in conjunction with a classical processor 610 to implement the desired quantum computing process. In the illustrated example, the QP controller 620 further implements the desired quantum computing process via one or more QP subcontrollers 604 that are specially adapted to control a corresponding one of the quantum processor(s) 602. For instance, in one example, the quantum controller 620 facilitates implementation of the compiled quantum circuit by sending instructions to one or more memories (e.g., lower-temperature memories), which then pass the instructions to low-temperature controller(s) (e.g., QP subcontroller(s) 604) that transmit, for instance, pulse sequences representing the gates to the quantum processor(s) 602 for implementation. In other examples, the QP controller(s) 620 and QP subcontroller(s) 604 operate to provide appropriate magnetic fields, encoded operations, or other such control signals to the quantum processor(s) to implement the operations of the compiled quantum computer circuit description. The quantum controller(s) can further interact with readout devices 608 to help control and implement the desired quantum computing process (e.g., by reading or measuring out data results from the quantum processors once available, etc.).

With reference to FIG. 6, compilation is the process of translating a high-level description of a quantum algorithm into a quantum computer circuit description comprising a sequence of quantum operations or gates, which can include the circuits as disclosed herein (e.g., the circuits configured to perform one or more of the procedures as disclosed herein or resulting from any of the disclosed techniques). The compilation can be performed by a compiler 622 using a classical processor 610 of the computing environment 600 which loads the high-level description from memory or storage devices 612 and stores the resulting quantum computer circuit description in the memory or storage devices 612.

In other embodiments, compilation and/or verification can be performed remotely by a remote computer 660 (e.g., a computer having a computing environment) which stores the resulting quantum computer circuit description in one or more memory or storage devices 662 and transmits the quantum computer circuit description to the computing environment 600 for implementation in the quantum processor(s) 602. Still further, the remote computer 660 can store the high-level description in the memory or storage devices 662 and transmit the high-level description to the computing environment 600 for compilation and use with the quantum processor(s). In any of these scenarios, results from the computation performed by the quantum processor(s) can be communicated to the remote computer after and/or during the computation process. Still further, the remote computer can communicate with the QP controller(s) 620 such that the quantum computing process (including any compilation, verification, and QP control procedures) can be remotely controlled by the remote computer 660. In general, the remote computer 660 communicates with the QP controller(s) 620, classical processor 610 via communication interface 650.

In particular embodiments, the computing environment 600 can be a cloud computing environment, which provides the quantum processing resources of the computing environment 600 to one or more remote computers (such as remote computer 660) over a suitable network (which can include the internet).

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
    a quantum processor comprising:
        a plurality of qubits arranged in a 3-colorable lattice of plaquettes such that each qubit of the plurality of qubits is represented by a respective edge of the lattice, each edge representing a single qubit of the plurality of qubits,
        wherein the plaquettes comprise plaquettes of a first plaquette type, a second plaquette type, and a third plaquette type, the plaquettes being arranged such that no plaquette is adjacent to a plaquette of the same plaquette type; and
    a classical processor configured to:

control quantum measurements on the plurality of qubits to perform a quantum error correction code based on Kramers-Wannier duality by performing a Kramers-Wannier circuit in a periodic sequence.

2. The apparatus of claim 1, wherein each of said plaquettes consists of six qubits.

3. The apparatus of claim 1, wherein the classical processor performs the quantum error correction code as rounds of a repeating sequence of three steps.

4. The apparatus of claim 3, wherein at a beginning of each of the three steps one third of the qubits are active qubits, and which qubits are the active qubits is different for each of the three steps.

5. The apparatus of claim 3, wherein the quantum error correction code is an automorphism code such that,
at each time step, the Kramers-Wannier circuit maps a logical operator to another logical operator and vice versa, and,
for each of the rounds of the three steps, the logical operator alternates with the another logical operator.

6. The apparatus of claim 3, wherein
a first step of the three steps is performed by performing the Kramers-Wannier circuit on qubits of the plaquettes of the first plaquette type,
a second step of the three steps is performed by performing the Kramers-Wannier circuit on qubits of the plaquettes of the second plaquette type, and
a third step of the three steps is performed by performing the Kramers-Wannier circuit on qubits of the plaquettes of the third plaquette type.

7. The apparatus of claim 1, wherein the Kramers-Wannier circuit maps a product of Z operators to a product of X operators and maps products of X operators to respective products of Z operators.

8. The apparatus of claim 1, wherein the Kramers-Wannier circuit implements one of four types of Kramers-Wannier duality, and the classical processor uses results of the quantum measurements on the plurality of qubits to determine which of the four types of Kramers-Wannier duality was implemented.

9. The apparatus of claim 1, wherein the classical processor
records measurement outcomes from each step of the periodic sequence of the quantum error correction code,
determines how plaquette stabilizers evolve based on the record measurement outcomes,
checks whether the record measurement outcomes agree with expected outcomes, and
when the record measurement outcomes do not agree with the expected outcomes, (i) the classical processor signals a fault occurred and (ii) the classical processor determines which fault occurred and applies one or more corrective unitary operators to the plurality of qubits.

10. The apparatus of claim 1, wherein the Kramers-Wannier circuit maps a product of X operators to a product of Z operators and vice-versa.

11. The apparatus of claim 1, wherein the Kramers-Wannier circuit comprises a set of Hadamard gates, a set of single-qubit Z measurements, a set of two-qubit XX measurements, a set of two-qubit ZZ measurements, and a set of single-qubit X measurements.

12. The apparatus of claim 1, wherein the Kramers-Wannier circuit comprises, a set of single-qubit X measurements, a set of two-qubit XZ measurements, a set of two-qubit ZX measurements, and another set of single-qubit X measurements.

13. The apparatus of claim 1, wherein the Kramers-Wannier circuit comprises a first set of single-qubit X measurements, a first set of controlled Z gates, a second set of controlled Z gates, and a second set of single-qubit X measurements.

14. A method of performing an error correction code, comprising:
controlling, using a classical processor, quantum measurements on a plurality of qubits to perform a quantum error correction code, the quantum error correction code being based on Kramers-Wannier duality, and the quantum error correction code includeing performing a Kramers-Wannier circuit in a periodic sequence,
wherein the plurality of qubits is arranged in a 3-colorable lattice of plaquettes such that each qubit of the plurality of qubits is represented by a respective edge of the lattice, each edge representing a single qubit of the plurality of qubits, wherein the plaquettes comprise plaquettes of a first plaquette type, a second plaquette type, and a third plaquette type, the plaquettes being arranged such that no plaquette is adjacent to a plaquette of the same plaquette type.

15. The method of claim 14, wherein the classical processor controls the quantum measurements on the plurality of qubits such that the quantum error correction code is performed as rounds of a repeating sequence of three steps.

16. The method of claim 15, wherein the classical processor controls the quantum measurements on the plurality of qubits such that
in a first step of the three steps, the Kramers-Wannier circuit is performed on qubits of the plaquettes of the first plaquette type,
in a second step of the three steps, the Kramers-Wannier circuit is performed on qubits of the plaquettes of the second plaquette type, and
in a third step of the three steps, the Kramers-Wannier circuit is performed on qubits of the plaquettes of the third plaquette type.

17. The method of claim 15, wherein the classical processor controls the quantum measurements to perform the quantum error correction code that is an automorphism code such that, at each step, the Kramers-Wannier circuit maps a logical operator to another logical operator and vice versa, and, for each of the rounds of the three steps, the logical operator alternates with the another logical operator.

18. The method of claim 14, wherein the classical processor controls the quantum measurements to perform the Kramers-Wannier circuit, and Kramers-Wannier circuit maps a product of Z operators to a product of X operators and maps products of X operators to respective products of X operators.

19. The method of claim 14, wherein the classical processor controls the quantum measurements on the plurality of qubits to perform the Kramers-Wannier circuit, wherein the Kramers-Wannier circuit implements one of four types of Kramers-Wannier duality, and the classical processor uses results of the quantum measurements on the plurality of qubits to determine which of the four types of Kramers-Wannier duality was implemented.

20. The method of claim 14, wherein the classical processor performs steps of
recording measurement outcomes from each step of the periodic sequence of the quantum error correction code, determining how plaquette stabilizers evolve based on the record measurement outcomes, checking whether the record measurement outcomes agree with expected outcomes, and when the record measurement outcomes do not agree with expected outcomes, the classical processor performs steps of signaling a fault occurred, determining which fault occurred, and applying one or more corrective unitary operators to the plurality of qubits.

\* \* \* \* \*